US012647726B2

(12) United States Patent
Takazawa et al.

(10) Patent No.: US 12,647,726 B2
(45) Date of Patent: Jun. 2, 2026

(54) MICROPHONE DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Takashi Takazawa, Nisshin (JP); Shuhei Shimanoe, Nisshin (JP); Tomoki Tanemura, Nisshin (JP); Masaaki Kawauchi, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 151 days.

(21) Appl. No.: 18/785,539

(22) Filed: Jul. 26, 2024

(65) Prior Publication Data

US 2025/0080906 A1 Mar. 6, 2025

(30) Foreign Application Priority Data

Aug. 31, 2023 (JP) ................................ 2023-141350
Jun. 4, 2024 (JP) ................................ 2024-090838

(51) Int. Cl.
*H04R 3/00* (2006.01)

(52) U.S. Cl.
CPC ......... *H04R 3/005* (2013.01); *H04R 2203/12* (2013.01)

(58) Field of Classification Search
CPC ................ H04R 3/005; H04R 2203/12; H04R 2201/003; H04R 2201/403; H04R 2499/13; H04R 1/406; H04R 1/08; H04R 3/00; H04R 2430/03
USPC .............................. 381/91, 92, 122, 111–115
See application file for complete search history.

(56) References Cited

U.S. PATENT DOCUMENTS 4,354,059 A * 10/1982 Ishigaki ................ H04R 3/005 381/103
5,303,307 A * 4/1994 Elko ........................ H04R 1/38 381/92
7,751,575 B1 * 7/2010 Baumhauer, Jr. ...... H04R 3/005 381/92
8,238,575 B2 * 8/2012 Buck ....................... G10L 25/78 704/226

(Continued)

FOREIGN PATENT DOCUMENTS

JP 2016-100628 A 5/2016
JP 2016-149612 A 8/2016
JP 2017-153030 A 8/2017

*Primary Examiner* — Xu Mei
(74) *Attorney, Agent, or Firm* — Posz Law Group, PLC

(57) ABSTRACT

A microphone device has plural microphones. A distance between two of the microphones is d. A signal-to-noise ratio of each of the microphones is MicSNR. A speed of sound is c. A frequency to be processed is f. An azimuth angle of an operator's seat relative to the microphones is θ. A minimum azimuth angle to be detected is Δθ. A voltage amplitude of an output signal of the microphone, with reference to a voltage output when a sound of 94 dBA is received, is A. A differential voltage effective ratio EDER is defined by a formula where $\Delta\tau = d/c\ \{\sin(\theta+\Delta\theta) - \sin\theta\}$, and the distance d is set to a value that satisfies $d < c/2f$ and $EDER > 0.7$.

14 Claims, 7 Drawing Sheets

(56) References Cited

U.S. PATENT DOCUMENTS

2017/0013355 A1* 1/2017 Kim ....................... H04R 19/04

* cited by examiner

MICROPHONE DEVICE

CROSS REFERENCE TO RELATED APPLICATION

This application is based on Japanese Patent Application No. 2023-141350 filed on Aug. 31, 2023 and Japanese Patent Application No. 2024-090838 filed on Jun. 4, 2024, the disclosures of which are incorporated herein by reference.

TECHNICAL FIELD

The present disclosure relates to a microphone device.

BACKGROUND

Techniques for voice recognition operation enable drivers to operate an air conditioner and the like in an automobile without having to take their eyes off the traveling direction of the vehicle. Various noises are generated during the vehicle operation. In response to this, a voice enhancement technique using a microphone array with multiple microphones is proposed to increase the signal-to-noise ratio, i.e., the intensity of the operator's voice signal relative to noise, to make it easier to recognize the operator's voice.

SUMMARY

According to one aspect of the present disclosure, a microphone device includes plural microphones. A distance between two of the microphones is defined as d. A signal-to-noise ratio of a single microphone is defined as MicSNR. A speed of sound is defined as c. A frequency to be processed is defined as f. An azimuth angle of an operator seat relative to the microphones is defined as θ. The minimum azimuth angle to be detected is defined as Δθ. A voltage amplitude of an output signal of the microphone with reference to an output voltage when a sound of 94 dBA is received is defined as A. The distance d is set to a value that satisfies d<c/2f and EDER>0.7 when a differential voltage effective ratio EDER is defined as $$EDER = \frac{2}{\pi}\cos^{-1}\frac{10^{\frac{-MicSNR}{20}}}{2A\sin(\pi f\Delta\tau)}$$

where Δτ=d/c {sin(θ+Δθ)−sin θ}.

DETAILED DESCRIPTION

Figure 1:
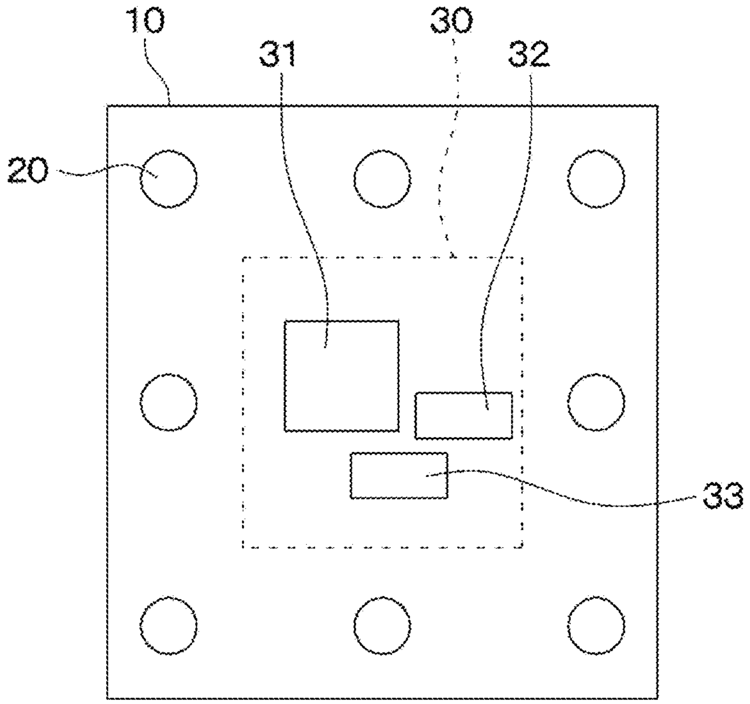
FIG. 1 is a front view of a microphone device according to an embodiment.

Techniques for voice recognition operation enable drivers to operate the air conditioner and other controls in an automobile without having to take their eyes off the traveling direction of the vehicle. Various noises are generated during the vehicle operation. In response to this, a voice enhancement technique using a microphone array with multiple microphones is proposed to increase the signal-to-noise ratio, i.e., the intensity of voice signal of an operator relative to noise, to make it easier to recognize the speech contents of the operator.

When a microphone device is mounted on a vehicle, the mounting space is limited, so the microphone device needs to be made compact. On the other hand, if the microphones are arranged closely together, a time difference and an amplitude difference between the signals from the microphones will be small relative to the electrical noise generated by the microphones themselves. In this case, the performance of the microphone array may not be maintained.

Therefore, it is desirable to set the microphone spacing to a value that allows the microphone device to be made smaller while still maintaining its performance. In this disclosure, the minimum microphone spacing is examined to ensure the performance of the microphone device.

The present disclosure provides a microphone device that can be downsized.

According to one aspect of the present disclosure, a microphone device includes plural microphones. A distance d is defined between two of the microphones. A signal-to-noise ratio of a single microphone is MicSNR. A speed of sound is c. A frequency to be processed is f. An azimuth angle of an operator seat relative to the microphones is θ. The minimum azimuth angle to be detected is Δθ. A voltage amplitude of an output signal of the microphone with reference to an output voltage when a sound of 94 dBA is received is A. The distance d is set to a value that satisfies d<c/2f and EDER>0.7 when a differential voltage effective ratio EDER is defined as $$EDER = \frac{2}{\pi}\cos^{-1}\frac{10^{\frac{-MicSNR}{20}}}{2A\sin(\pi f\Delta\tau)}$$

where Δτ=d/c {sin(θ+Δθ)−sin θ}.

It is possible to restrict the difference between the output signals of the multiple microphones from being buried in self-noise, by setting the distance d so as to satisfy the formula of EDER>0.7. Therefore, by reducing the distance d within a range that satisfies the formula of EDER>0.7, it is possible to reduce the size of the microphone device while ensuring the speech recognition performance.

Hereinafter, an embodiment will be described with reference to the drawings. In the following embodiment, the same or equivalent parts are denoted by the same reference numerals as each other, and the explanation will be provided.

A microphone device of this embodiment is mounted in a vehicle and used for voice recognition operations. As shown in FIG. 1, the microphone device includes a substrate 10, microphones 20, and a signal processing unit 30.

The substrate 10 is a rectangular plate member made of resin or the like. The microphone device is mounted in a vehicle by fixing the substrate 10 to the dashboard, the overhead console, or the like.

The microphone 20 receives sound waves and outputs a signal corresponding to the sound pressure of the received sound wave. As the microphone 20, a MEMS (Micro Electro Mechanical Systems) microphone or the like is used.

The microphone 20 is a high signal-to-noise ratio microphone. Specifically, the signal-to-noise ratio MicSNR is 70 dB or more, for example 78 dB, when the ratio of the output signal to the self-noise with reference to 94 dBA and 1 kHz of the microphone 20 is defined in dB as the signal-to-noise ratio MicSNR. A least significant bit (LSB) voltage corresponding to the LSB of an analog-to-digital converter (ADC) 31 (described later) is set smaller than an output voltage due to the self-noise of the microphone 20.

The microphone device includes the plural microphones 20. Specifically, the number of the microphones 20 is 2n, where n is a natural number. The microphones 20 are arranged in an array in two or three directions at an angle to one another.

In this embodiment, eight microphones 20 are arranged on the substrate 10. Four of the eight microphones 20 are located at respective corners of the substrate 10. The remaining four are disposed between the microphones 20 at the corners of the substrate 10. That is, the eight microphones 20 are arranged in a rectangular manner.

The signal processing unit 30 processes the output signal of the microphone 20, and includes an ADC 31, a microcomputer 32, and an interface 33. The signal processing unit 30 is disposed at the center of the microphones 20 arranged in a rectangular manner.

The ADC 31 converts the analog voltage signal output by the microphone 20 into a digital signal. The ADC 31 performs AD conversion on the output signal of the microphone 20. The digital signal generated by the ADC 31 is input to the microcomputer 32.

The microcomputer 32 performs a voice enhancement process or a noise reduction process based on the digital signal generated by the ADC 31.

The interface 33 connects the microphone device to another device. A signal generated by the voice enhancement process by the microcomputer 32 is transmitted to another device via the interface 33.

Figure 2:
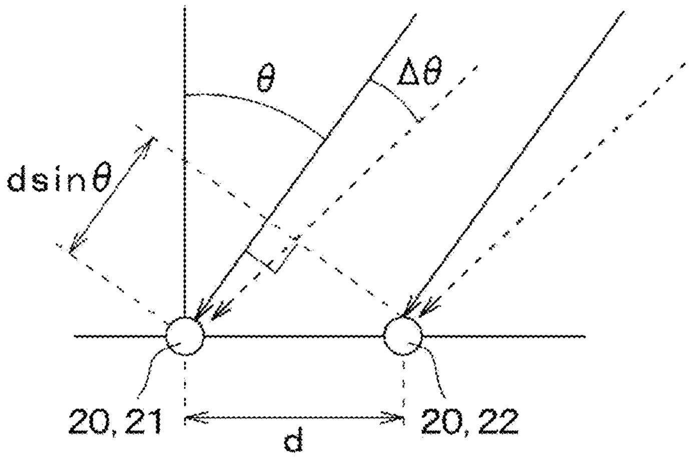
FIG. 2 is a diagram for explaining a detection of an azimuth angle.

The effects obtained by arranging the microphones 20 in a rectangular manner will be described. As shown in FIG. 2, among the eight microphones 20, two adjacent microphones 20 are designated as microphones 21 and 22. The distance between the microphones 21 and 22 is d. The azimuth angle of the direction of arrival of the sound wave with respect to the normal to the surface of the substrate 10 is defined as θ. Specifically, the azimuth angle θ is an azimuth angle of an operator seat relative to the substrate 10 and the multiple microphones 20. Let c be the speed of sound. A time difference τ between the signals detected by the microphones 21 and 22 is defined by a formula of $\tau=(d/c)\sin\theta$.

The amount of change in the time difference between the output signals of the microphones 21 and 22, when the azimuth angle of the sound wave changes by Δθ with respect to the azimuth angle θ, is denoted as Δτ. Due to $\tau+\Delta\tau=1/c\cdot\{d\sin(\theta+\Delta\theta)\}$, a formula of $\Delta\tau=(d/c)\cdot\sin(\theta+\Delta\theta)-\tau=(d/c)\{\sin(\theta+\Delta\theta)-\sin\theta\}$ is satisfied.

Figure 3:
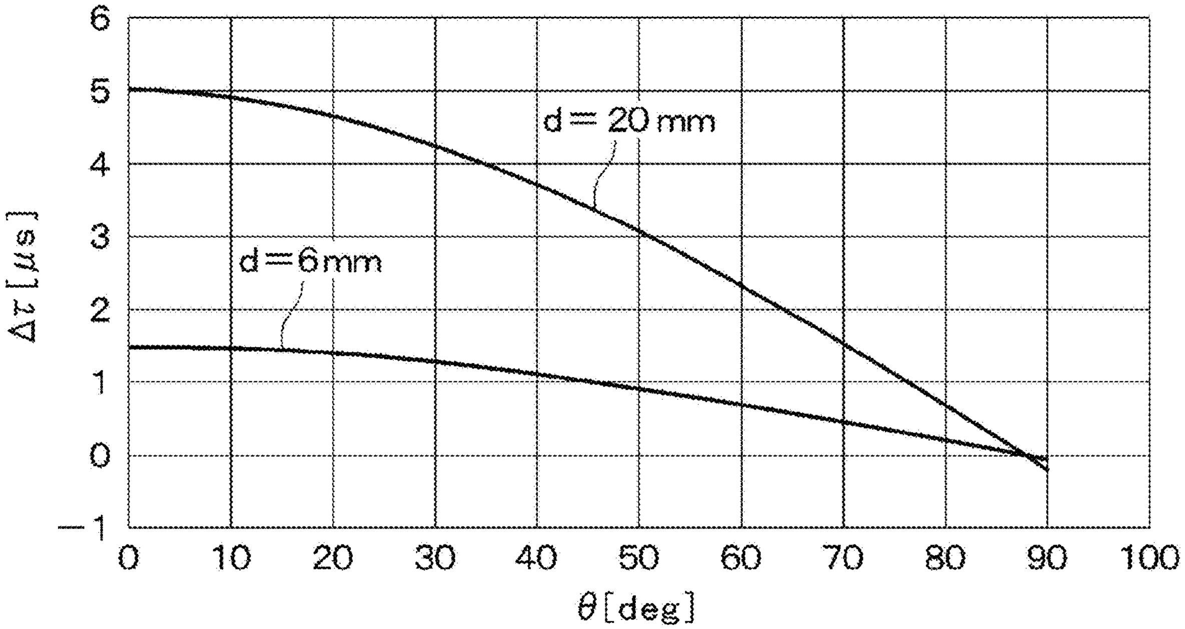
FIG. 3 is a diagram showing a relationship between the azimuth angle and an angular resolution.

For example, FIG. 3 shows a relationship between the azimuth angle θ and |Δτ| when Δθ=5°. When Δθ is the minimum azimuth angle to be detected with the microphone device, Δτ represents the angular resolution expressed in the time domain. As shown in FIG. 3, when θ=90°, Δτ=0, that is, the angular resolution is approximately zero.

In the cabin of an automobile, the operator's voice is reflected by the interior walls of the cabin and reaches the microphone device from various directions. Therefore, in order to identify the direction of the sound source and separate the operator's voice from noise to enhance the voice, the angular resolution needs to be greater than 0.

Figure 4:
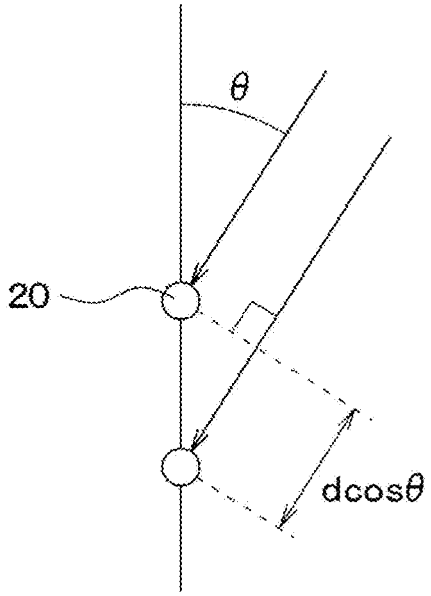
FIG. 4 is a diagram for explaining a detection of an azimuth angle.

In this embodiment, as shown in FIG. 4, some of the microphones 20 are arranged in a direction different from the arrangement direction of the microphones 21 and 22 of FIG. 2. Specifically, when the arrangement direction in which the microphones 21 and 22 are arranged is defined as a first direction, some of the microphones 20 are arranged in a second direction perpendicular to the first direction.

Figure 5:
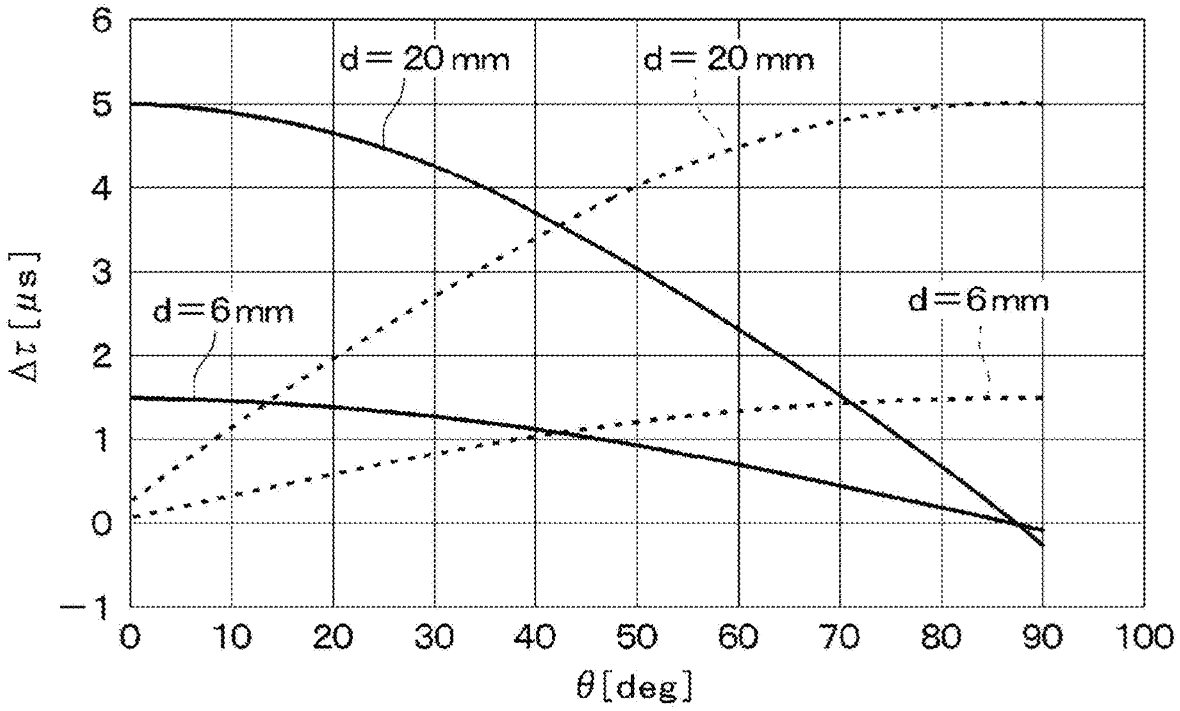
FIG. 5 is a diagram showing a relationship between the azimuth angle and an angular resolution.

As a result, the Δτ characteristics are as shown in FIG. 5. That is, in the vicinity of θ=90° where the angular resolution of the microphones 21 and 22 is 0, the angular resolution of the two microphones 20 shown in FIG. 4 is maximized, and the two types of Δτ characteristics complement each other in angular resolution. In FIG. 5, the solid lines indicate Δτ of the microphones 21 and 22, and the dashed lines indicate Δτ of the microphones 20 shown in FIG. 4.

In this way, by arranging the multiple microphones 20 along two axes mutually inclined to each other, it is possible to obtain characteristics in which the angular resolutions are mutually complementary, thereby restricting the angular resolution of the entire microphone device from becoming zero.

Furthermore, by arranging the multiple microphones 20 in a rectangular manner along two orthogonal axes, it is possible to restrict the occurrence of azimuth angle where the angular resolution becomes extremely small such that the effect of voice enhancement or noise suppression is reduced, in all 360° directions.

As described above, in this embodiment, the eight microphones 20 are arranged on the substrate 10. Alternatively, at least three microphones 20 are provided, and one of the three microphones 20 is located away from a straight line connecting the other two microphones 20. In this case, it is possible to suppress the deterioration of the angular resolution. Furthermore, it is possible to suppress the decrease in angular resolution in all directions, so that the straight line connecting the other two microphones 20 is set perpendicular to a straight line connecting two microphones 20 including the one of the microphone 20.

Alternatively, at least four microphones 20 are provided, and the microphones 20 can be arranged in a rectangular shape, making it possible to suppress a decrease in angular resolution. Furthermore, the microphones 20 may be arranged three-dimensionally. For example, at least four microphones 20 may be provided, with one of the four microphones 20 positioned away from a plane passing through the other three microphones. Even when the microphone 20 is arranged in this manner, the decrease in angular resolution can be suppressed. Furthermore, when the microphones 20 are arranged in this manner, the detection capability can be improved.

Figure 6:
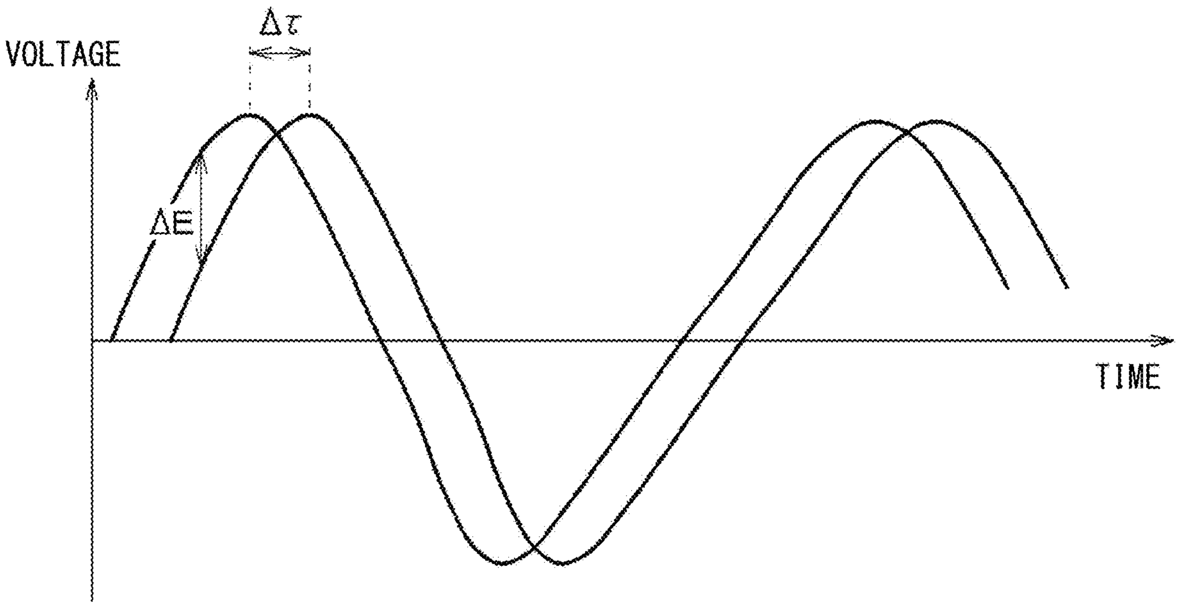
FIG. 6 is a diagram showing an output signal of a microphone.

The lower limit of the distance d will now be described. As shown in FIG. 6, a voltage difference $\Delta E$ occurs between the voltages of the output signals of the two microphones 20 according to the time difference $\Delta\tau$. If there is no noise in the output signal, the time difference $\Delta\tau$ can be detected based on this voltage difference $\Delta E$. In reality, however, electrical noise from the microphone 20 itself causes noise to be superimposed on the output signal. The present inventors have examined the relationship between the magnitude of the electrical noise of the microphone 20 and whether or not $\Delta\tau$ can be detected.

Assume that the two output signals shown in FIG. 6 are sine waves with amplitude A and frequency f. In this case, ignoring the initial phase, the voltage difference $\Delta E$ is defined as $\Delta E = A \sin(2\pi ft) - A \sin\{2\pi f(t-\Delta\tau)\} = 2A \sin(\pi f\Delta\tau)\cdot\cos\{\pi f(2t-\Delta\tau)\}$, where t is time and IT is the constant of the circumference of a circle. That is, the voltage difference $\Delta E$ is expressed by a cosine function with an amplitude of $2A \sin(\pi f\Delta\tau)$.

Figure 7:
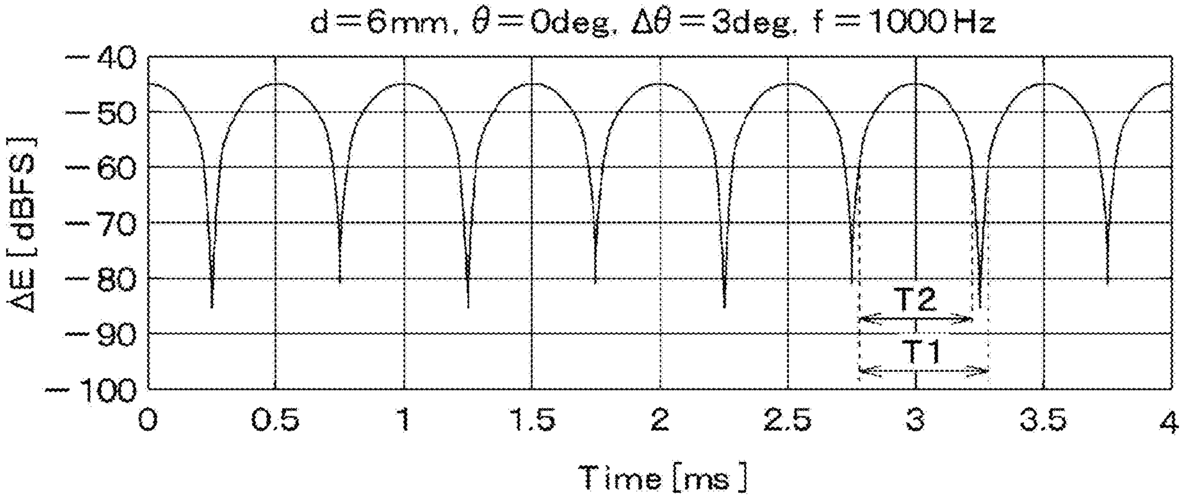
FIG. 7 is a diagram showing a voltage difference between output signals of microphones.

When d=6 mm, $\theta=0°$, $\Delta\theta=3°$, f=1 kHz, and A=1, a formula of $\Delta\tau=0.91$ μs is obtained. The voltage difference $\Delta E$ at this time is shown in FIG. 7. The amplitude is expressed in decibels with amplitude A being 0 dB as the reference.

The waveform shown in FIG. 7 is in an ideal state where there is no electrical noise. In an actual circuit, a certain amount of electrical noise is superimposed on the waveform shown in FIG. 7. For example, when a microphone 20 with an SN ratio of 60 dB is used, electrical noise with an effective amplitude of 0.001, i.e., −60 dB, is superimposed on the reference amplitude of the input signal to the microphone 20 of 1.00, i.e., 94 dBA. At this time, in the waveform shown in FIG. 7, signals with an amplitude of −60 dB or less are buried in electrical noise, making it impossible to detect the time difference.

Here, the amplitude of the reference electrical noise is defined as the reference amplitude Ath, and the ratio of the time during which the voltage difference $\Delta E$ is equal to or greater than the reference amplitude Ath to the time of the entire signal is defined as the effective delta-E ratio (EDER). That is, EDER=T2/T1 when the period of the voltage difference $\Delta E$ is T1 and the length of time is T2 while $\Delta E$ is equal to or greater than the reference amplitude Ath, of the one period. For example, if the reference amplitude Ath is −60 dB, T2 becomes the time shown in FIG. 7. EDER=100% represents a state in which the voltage difference $\Delta E$ can be completely detected. EDER=0% represents a state in which the voltage difference $\Delta E$ is buried in noise and cannot be detected.

Figure 8:
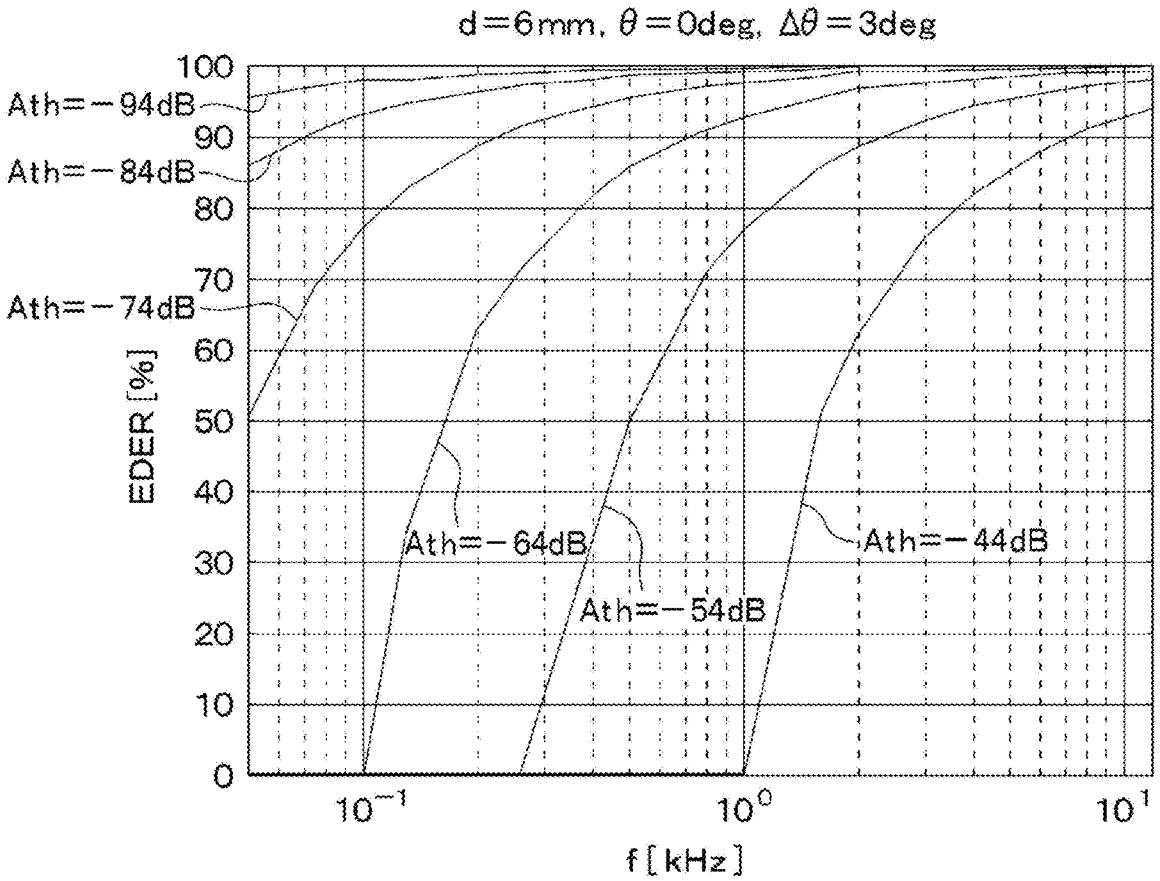
FIG. 8 is a diagram showing a relationship between a frequency and a differential voltage effective ratio.

The EDER is a function of the frequency f, the amplitude A, and the SN ratio MicSNR. The lower the frequency f and the larger the amplitude of the electrical noise, the smaller the EDER. For example, when d=6 mm, $\theta=0°$, and $\Delta\theta=3°$, the EDER is as shown in FIG. 8.

In order for the EDER to be equal to or greater than 0, it is necessary that the amplitude term is not buried in the electrical noise of the microphone 20. In other words, it is necessary to satisfy a formula of $2A \sin(\pi f\Delta\tau) \geq 10\hat{}(-MicSNR/20)$. Here, the amplitude A is set to the relative effective voltage amplitude of the output signal from the microphone 20 when the reference amplitude is 1.0, in other words, when the voltage is 0 dB in case where a sound of 94 dBA is received.

Since the EDER is expressed by a cosine function, which is a periodic function, in order to obtain the ratio of time during which the amplitude is equal to or greater than a certain value, for example, the ratio of time is calculated in the range from 0 to $\pi/2$. Assume that Amp>0, $Amp=|2A \sin(\pi f\Delta\tau)|$, and $\varphi$ is a phase angle at which $|\Delta E|$ becomes a certain voltage value Const. Due to $Amp\cdot\cos\varphi=Const$ and $\varphi=\cos^{-1}(Const/Amp)$, a formula of $EDER=\cos^{-1}(Const/Amp)/(\pi/2)$ is satisfied in the range from 0 to $\pi/2$. Here, $Const=10\hat{}(-MicSNR/20)$ and Amp>Const. That is, the EDER is defined by Formula 1.

$$EDER = \frac{2}{\pi}\cos^{-1}\frac{10^{\frac{-MicSNR}{20}}}{2A\sin(\pi f\Delta\tau)} \quad \text{(Formula 1)}$$

Furthermore, in experiments conducted by the present inventors, good performance is obtained when EDER>0.7. From the above, the distance d that allows the microphone device to be made smaller in size while still achieving good performance is a value that satisfies EDER>0.7.

In Formula 1, the frequency f is the lowest frequency within the frequency band that is the target of signal to be processed in the signal processing unit 30, and is set to, for example, f>100 Hz. When the vehicle is traveling, the noise that enters the microphone 20 contains a very large amount of low-frequency components. Therefore, a voice recognition device is provided with a filter that reduces the volume of the low-frequency components, thereby reducing consumption of the dynamic range of the ADC. The lowest frequency f is the cutoff frequency of the filter. Furthermore, in Formula 1, the amplitude A is the relative effective voltage amplitude of the output signal of the microphone 20 when the reference amplitude is 1.0, that is, when the amplitude of the signal output by the microphone 20 is 0 dB in case where receiving a sound of 94 dBA. The effective voltage amplitude is calculated by $1/\sqrt{2}\times$voltage amplitude.

It is desirable for the dynamic range of the ADC 31 to be greater than the dynamic range of the microphone 20. If the sound pressure at the rated maximum output of the microphone 20 is MicMAX, the dynamic range of the microphone 20 is represented by (MicMAX−94)+MicSNR. Furthermore, if the number of conversion bits of the ADC 31 is m, the dynamic range of the ADC 31 is $20\times\log_{10}(2^m-1)$. The dynamic range of the ADC 31 may be smaller than the dynamic range of the microphone 20. In this case, MicSNR in Formula 1 is replaced with the pseudo SN ratio of the ADC 31 calculated from the dynamic range of the ADC 31. In addition, the dynamic range of the ADC 31 may be equal to the dynamic range of the microphone 20. The dynamic range of the ADC 31 being larger than the dynamic range of the microphone 20 is equivalent to the LSB voltage of the ADC 31 being smaller than the self-noise of the microphone 20. As described above, in this embodiment, the LSB voltage of the ADC 31 is smaller than the self-noise of the microphone 20, but the LSB voltage of the ADC 31 may be larger than the self-noise of the microphone 20. In addition, the LSB voltage of the ADC 31 may be equal to the self-noise of the microphone 20.

Microphones for voice recognition have been placed near the steering column, but in recent years their locations have been closer to the mouth of the driver or passenger in the front seat, such as in the overhead console or near the headliner.

Regarding $\Delta\theta$, it is considered possible to separate and recognize sound sources if the size of a human face can be distinguished. The distance between the substrate 10 and the operator's seat, more specifically, the distance between the microphones 20 arranged on the substrate 10 and the operator's mouth is set to L [m]. Since the width of a human face is approximately 156 mm, it is believed that noise reduction is possible if θ=0° and Δθ=arctan (0.078/L) can be distinguished.

Figure 9:
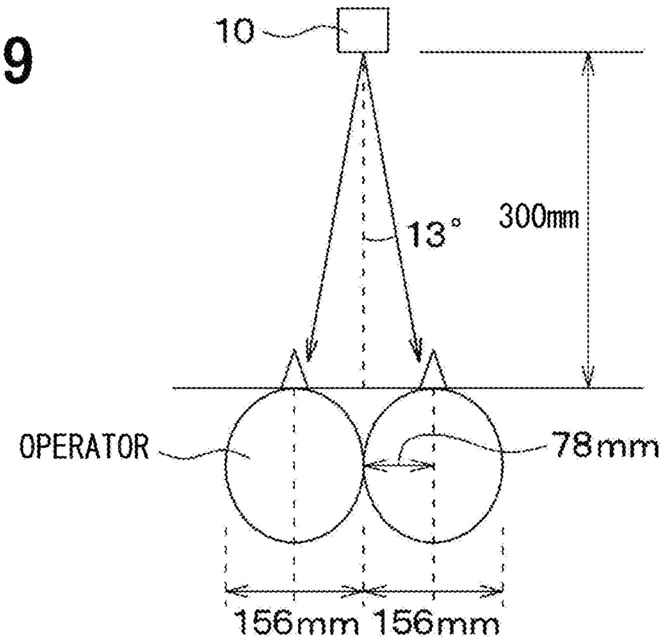
FIG. 9 is a diagram for explaining a required angular resolution.

For example, as shown in FIG. 9, when the distance L is about 0.3 m, it is considered that noise reduction is possible if the direct sound can be distinguished within about ±13°, based on arctan (0.078/0.3)=13°. Furthermore, when the distance L is about 0.4 m, it is considered that noise reduction is possible if about +11° can be distinguished for the direct sound, based on arctan (0.078/0.4)=11°.

Figure 10:
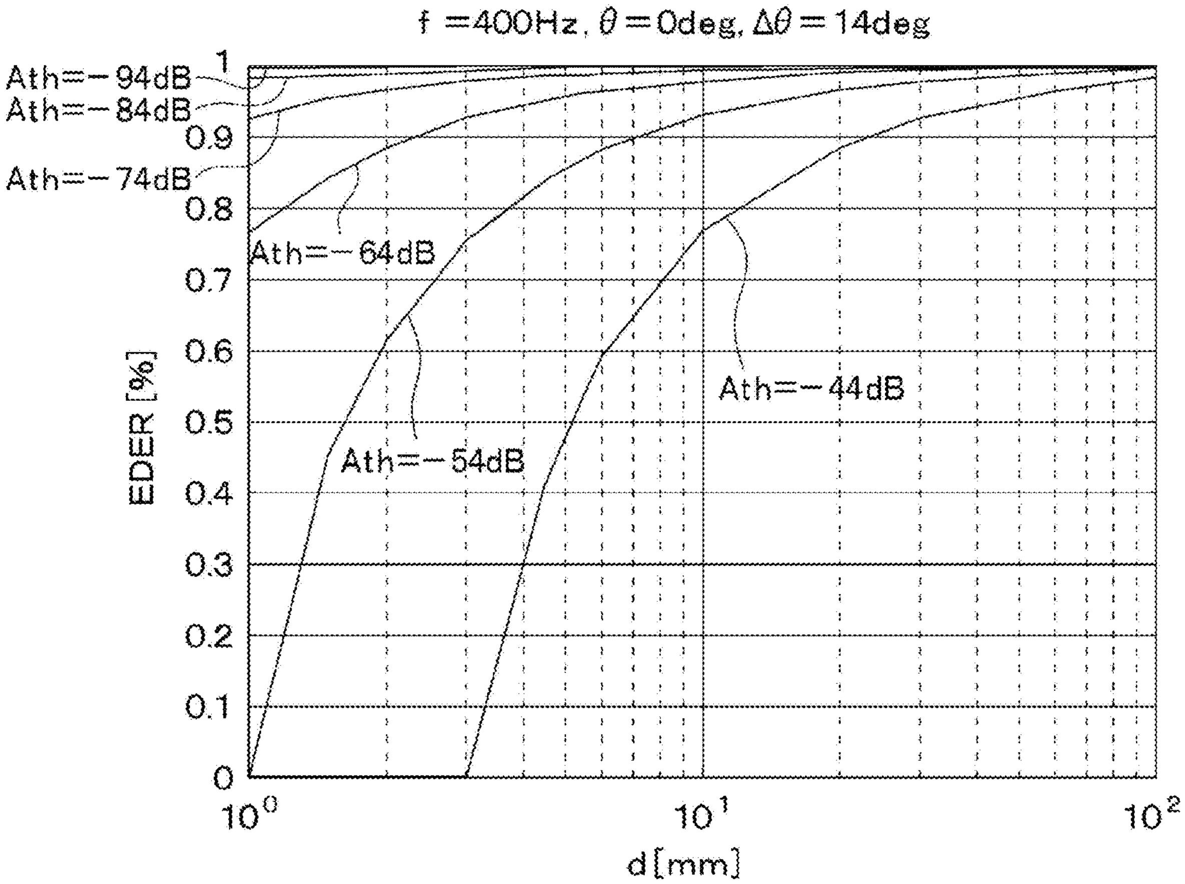
FIG. 10 is a diagram showing a relationship between a microphone spacing and a differential voltage effective ratio.
Figure 11:
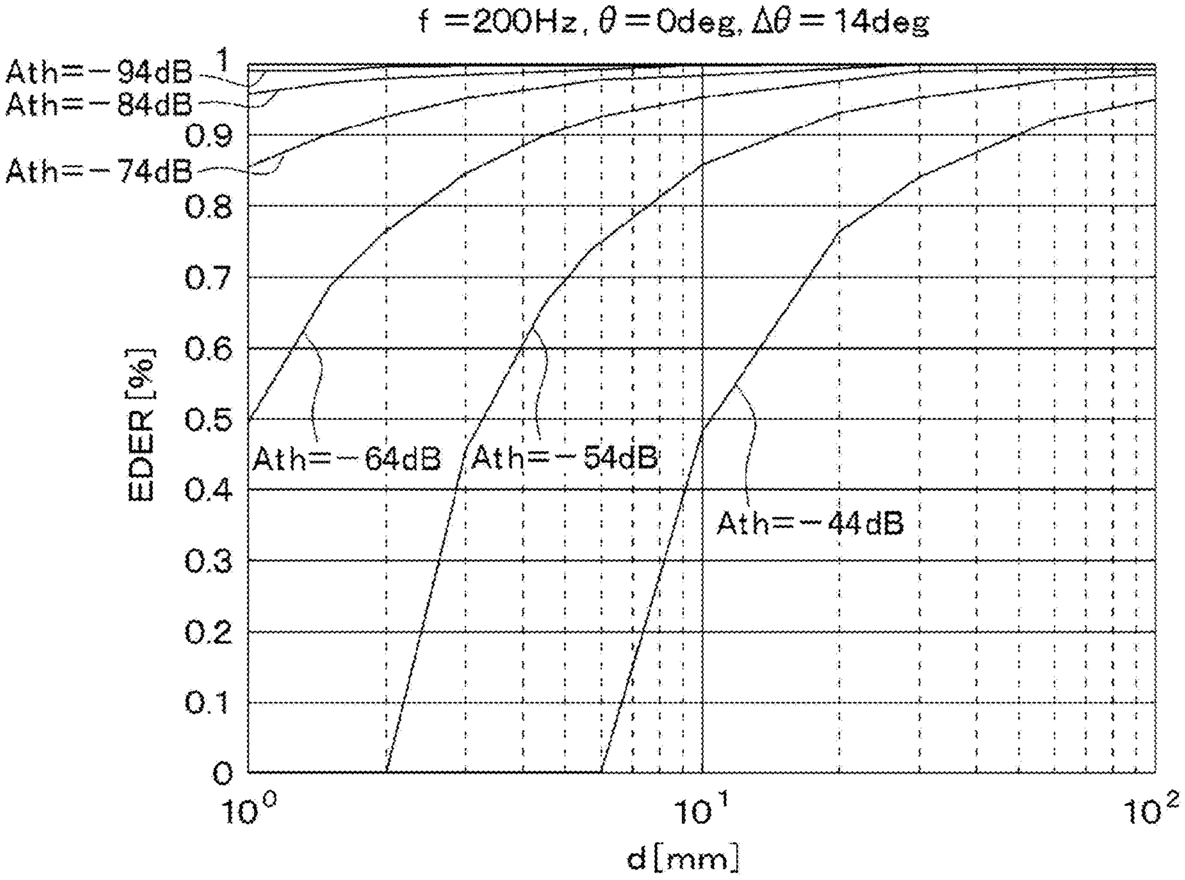
FIG. 11 is a diagram showing a relationship between a microphone spacing and a differential voltage effective ratio.
Figure 12:
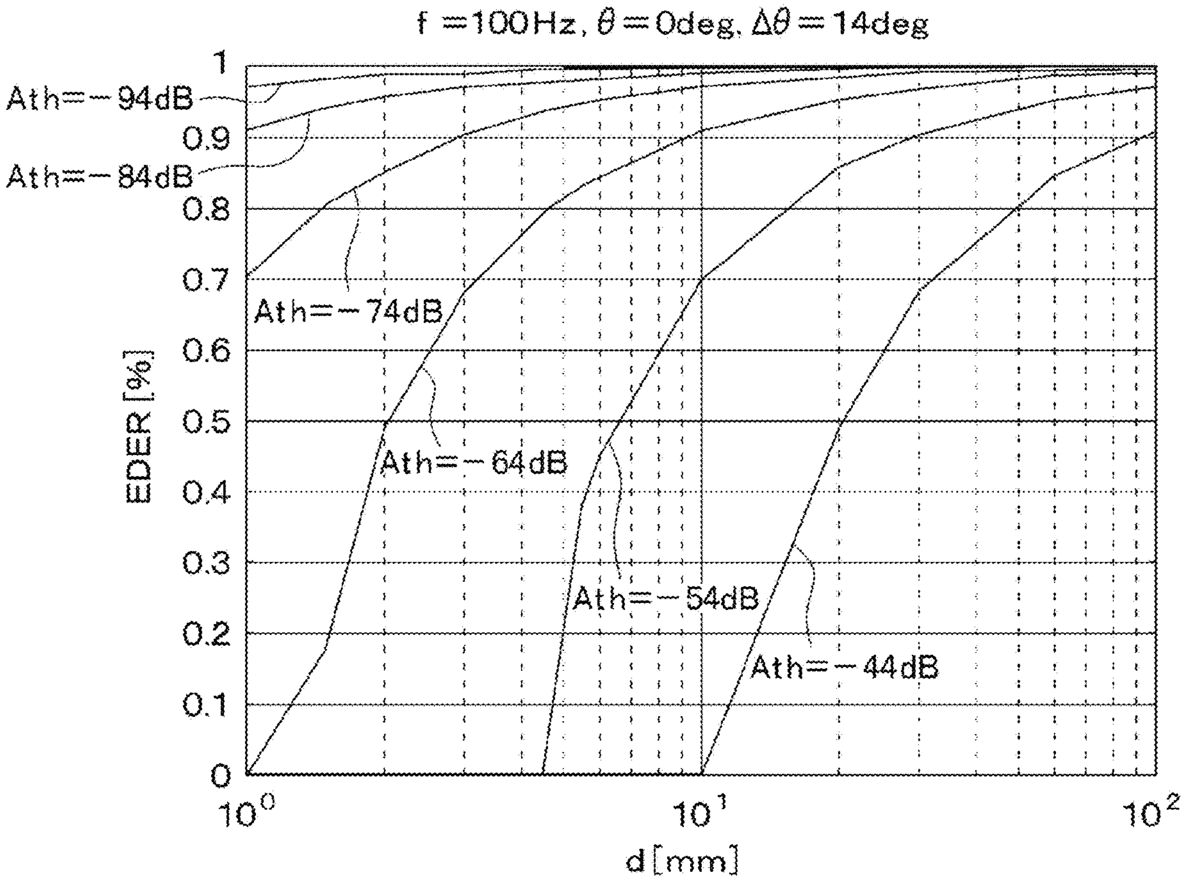
FIG. 12 is a diagram showing a relationship between a microphone spacing and a differential voltage effective ratio.

The relationship between the frequency f, the SN ratio MicSNR, and the lower limit of the distance d is as shown in, for example, FIGS. 10 to 12. FIG. 10 shows a graph of EDER when f=400 Hz, θ=0°, and Δθ=14°. FIG. 11 shows a graph of EDER when f=200 Hz, θ=0°, and Δθ=14°. FIG. 12 shows a graph of EDER when f=100 Hz, θ=0°, and Δθ=14°.

As shown in FIG. 10, at f=400 Hz, EDER>0.7 is satisfied when MicSNR=54 dB, d>2.6 mm, or when MicSNR=44 dB, d>8.2 mm.

As shown in FIG. 11, at f=200 Hz, EDER>0.7 is satisfied when MicSNR=44 dB, d>17 mm, when MicSNR-54 dB, d>5.0 mm, or when MicSNR=64 dB, d>1.7 mm.

As shown in FIG. 12, at f=100 Hz, EDER>0.7 is satisfied when MicSNR=44 dB, d>33 mm, when MicSNR=54 dB, d>10 mm, or when MicSNR=64 dB, d>3.2 mm.

In this manner, the EDER is defined by the frequency f, the SN ratio MicSNR, the azimuth angle θ, the minimum azimuth angle Δθ, and the amplitude A. By determining the condition of the distance d such that EDER>0.7, the distance d can be reduced within a range in which the performance of the microphone device can be ensured, thereby making it possible to miniaturize the microphone device.

The upper limit of the distance d will now be described. The greater the distance d, the higher the directivity of the microphone device. On the other hand, if the distance d exceeds half the wavelength of the sound of frequency f, spatial aliasing occurs. That is, if the wavelength of a sound of frequency f input to the microphone 20 is λ, then spatial aliasing occurs when d>λ/2=(c/f)·(1/2). Therefore, it is desirable to set the distance d to a value that satisfies d<c/2f.

It is said that the audible range for humans is about 20 Hz to 20 kHz, but for voice, the International Telecommunication Union-Telecommunication sector (ITU-T) specifies the telephone frequency band as 300 Hz to 3.4 kHz. Therefore, in order to maintain the speech recognition performance, it is desirable to set the upper limit of the frequency f to 3.4 kHz and to satisfy d<c/2f within this frequency f range.

If the Celsius temperature is deg_c, c=331.5+0.61×deg_c, and at room temperature, for example 25° C., c~347 m/s. In this case, the maximum value of the distance d that can suppress the spatial aliasing at frequencies f up to 3.4 kHz is calculated as 347 [m/s]/3.4 [KHz]×1/2≈51 [mm].

In reality, voice includes a wide frequency band, and the direction from which the sound comes is determined not by a single frequency but also by frequency bands above and below it. Therefore, the distance d may not satisfy d<λ/2. However, it is desirable to suppress the occurrence of spatial aliasing in bands that contain a large amount of voice information.

Moreover, in order to miniaturize the microphone device while maintaining its performance, it is desirable to bring the EDER closer to 0.7. For example, it is desirable to set the distance d so that 0.8>EDER is satisfied.

Regarding the upper and lower limits of the distance d, it is sufficient that the distance d between at least two adjacent microphones 20 satisfies the above conditions. In some of the microphones 20, the distance d may not need to satisfy the above conditions.

As described above, in this embodiment, by setting the distance d so as to satisfy EDER>0.7, it is possible to restrict the difference between the output signals of the multiple microphones from being buried in self-noise. Therefore, by reducing the distance d within a range that satisfies EDER>0.7, it is possible to reduce the size of the microphone device while ensuring the speech recognition performance.

Further, according to the embodiment, it is possible to achieve the following advantageous effects.

(1) At least three microphones 20 are provided, and one of the microphones 20 is positioned away from a straight line connecting the other two microphones 20. This makes it possible to suppress a decrease in angular resolution.

(2) The straight line connecting the other two microphones 20 is perpendicular to a straight line connecting the one of the microphones 20 to another microphone. This makes it possible to suppress a decrease in angular resolution.

(3) The signal processing unit 30 is disposed in the center of the multiple microphones 20 arranged in a rectangular manner. This makes it possible to restrict the substrate 10 from becoming large.

(4) The number of microphones 20 is 2n. When performing digital processing, if the amount of data is a power of two, there are no wasted digits when expressed in binary, and processing can be done efficiently using the same memory capacity and communication bandwidth resources.

(5) The microphone 20 is a MEMS microphone. According to this, the microphone 20 can be made smaller, less expensive, and has less variation in characteristics than when a dynamic microphone, a condenser microphone, an ECM (Electret Condenser Microphone), or the like is used as the microphone 20.

Other Embodiment

The present disclosure is not limited to the above-described embodiment, and can be appropriately modified. Moreover, it goes without saying that the components included in the above embodiment are not necessarily required unless specified as being required, regarded as being clearly required in principle, or the like. The numerical value such as the number, the numerical value, the quantity, the range, or the like of components mentioned in the above-described embodiment is not limited to a specific number unless specified as being required, clearly limited to such a specific number in principle, or the like. The shape, the positional relationship, and the like of a component or the like mentioned in the above embodiments are not limited to those being mentioned unless otherwise specified, limited to specific shape, positional relationship, and the like in principle, or the like.

What is claimed is:

1. A microphone device comprising:

a plurality of microphones, wherein a distance d is defined between two of the microphones, a signal-to-noise ratio of each of the microphones is defined as MicSNR, a speed of sound is defined as c, a frequency to be processed is defined as f,
an azimuth angle of an operator seat with respect to the plurality of microphones is defined as θ,
a minimum azimuth angle to be detected is defined as Δθ,
a voltage amplitude of an output signal of the microphone, with reference to an output voltage when receiving a sound of 94 dBA, is defined as A,
a differential voltage effective ratio EDER is denned as $$EDER = \frac{2}{\pi}\cos^{-1}\frac{10^{\frac{-MicSNR}{20}}}{2A\sin(\pi f \Delta\tau)}$$

where Δτ=d/c{sin(θ+Δθ)−sin θ}, and
the distance d is set to a value that satisfies d<c/2f and EDER>0.7.

2. The microphone device according to claim 1, wherein the distance d is set to a value that satisfies d<c/2f and EDER>0.7 when f≤3.4 kHz.

3. The microphone device according to claim 1, wherein a dimension between the microphone and an operator seat is defined as L [m], and
the distance d is set to a value that satisfies d<c/2f and EDER>0.7 when θ=0° and Δθ=arctan(0.078/L).

4. The microphone device according to claim 3, wherein the distance d is set to a value that satisfies d<c/2f and EDER>0.7 when L=0.3 m.

5. The microphone device according to claim 1, wherein the distance d is set to a value that satisfies d<c/2f and EDER>0.7 when MicSNR≥70 dB.

6. The microphone device according to claim 1, which is installed in a vehicle and used for voice recognition, wherein
the distance d is set to a value that satisfies d<c/2f and EDER>0.7 when f≥100 Hz.

7. The microphone device according to claim 1, wherein
the number of the microphones is at least three, and
one of the microphones is disposed at a position away from a straight line connecting the other two microphones.

8. The microphone device according to claim 7, wherein
the straight line connecting the other two microphones is perpendicular to a line connecting two of the microphones including the one of the microphones.

9. The microphone device according to claim 8, wherein
the number of the microphones is at least four, and
the microphones are arranged in a rectangular manner.

10. The microphone device according to claim 9, further comprising a signal processing unit disposed at a center of the plurality of microphones arranged in a rectangular manner.

11. The microphone device according to claim 1, wherein
the number of the microphones is $2^n$, in which n is a natural number.

12. The microphone device according to claim 11, wherein
the number of the microphones is eight.

13. The microphone device according to claim 1, wherein
the number of the microphones is at least four, and
one of the four microphones is disposed away from a plane passing through the other three microphones.

14. The microphone device according to claim 1, wherein the microphone is a MEMS microphone.

* * * * *